(12) United States Patent
Xiong

(10) Patent No.: US 12,244,239 B1
(45) Date of Patent: Mar. 4, 2025

(54) MULTI-CHANNEL ALTERNATING CURRENT CONVERSION CIRCUIT, POWER SUPPLY APPARATUS AND ELECTRONIC DEVICE

(71) Applicant: Shenzhen Segre Electronic Co., Ltd., Guangdong (CN)

(72) Inventor: Wanglong Xiong, Guangdong (CN)

(73) Assignee: Shenzhen Segre Electronic Co., Ltd., Shenzhen (CN)

( * ) Notice: Subject to any disclaimer, the term of this patent is extended or adjusted under 35 U.S.C. 154(b) by 0 days.

(21) Appl. No.: 18/931,851

(22) Filed: Oct. 30, 2024

(30) Foreign Application Priority Data

Oct. 16, 2024 (CN) .......................... 202422507961.3

(51) Int. Cl.
*H02M 5/45* (2006.01)
*H02M 1/32* (2007.01)
*H02M 3/335* (2006.01)
*H02M 5/458* (2006.01)

(52) U.S. Cl.
CPC ........... *H02M 5/4585* (2013.01); *H02M 1/32* (2013.01); *H02M 3/33523* (2013.01)

(58) Field of Classification Search
CPC ................. H02M 5/4585; H02M 1/32; H02M 3/33523
See application file for complete search history.

(56) References Cited

U.S. PATENT DOCUMENTS 10,270,355 B1* 4/2019 Xiong ................. H02M 5/4585
10,461,648 B2* 10/2019 Xiong ............... H02M 7/53871

* cited by examiner

*Primary Examiner* — Rafael O Leon De Domenech
(74) *Attorney, Agent, or Firm* — Renner, Otto, Boisselle & Sklar, LLP

(57) ABSTRACT

A multi-channel alternating current conversion circuit, a power supply apparatus and an electronic device are disclosed. The multi-channel alternating current conversion circuit includes an AC input terminal, an AC-AC conversion unit, an AC-AC voltage reduction unit and an AC-DC voltage reduction unit. The AC-AC conversion unit includes a thyristor voltage reduction circuit, a no-load freewheeling voltage stabilizing circuit and a first AC output terminal. The AC input terminal is connected to an input terminal of the thyristor voltage reduction circuit and an input terminal of the no-load freewheeling voltage stabilizing circuit. An output terminal of the thyristor voltage reduction circuit and an output terminal of the no-load freewheeling voltage stabilizing circuit are connected to an output terminal of the first AC output terminal. The no-load freewheeling voltage stabilizing circuit keeps a voltage of the first AC output terminal stable through resistor-capacitor voltage reduction and voltage division under no-load conditions.

8 Claims, 7 Drawing Sheets

MULTI-CHANNEL ALTERNATING CURRENT CONVERSION CIRCUIT, POWER SUPPLY APPARATUS AND ELECTRONIC DEVICE

CROSS-REFERENCE TO RELATED APPLICATION

This application is based on and claims the benefit of priority from Chinese Patent Application No. 2024225079613, filed on Oct. 16, 2024, the entirety of which is incorporated by reference herein.

TECHNICAL FIELD

The present disclosure relates to the field of power supplies, and in particular, to a multi-channel alternating current conversion circuit, a power supply apparatus and an electronic device.

BACKGROUND

With the development of industry and technology, various electronic products and home appliances and other electronic devices emerge continuously. However, the various electronic products and home appliances require different operating voltages and types. Therefore, alternating current conversion circuits have been developed to process alternating current (AC) and generate alternating current or direct current (DC) with different voltage levels to meet the requirements of different electronic devices. The disadvantages of current alternating current conversion circuit are as follows: 1) the current alternating current conversion circuit can only provide a single output of either AC or DC, offering limited functionality; and 2) some AC conversion circuits apply thyristor voltage reduction circuits to achieve AC output. However, the device with leakage protection cannot be used in thyristor circuits, resulting in poor user experiences.

SUMMARY

The present disclosure aims to solve at least one of the technical problems in the existing technology. To this end, a multi-channel alternating current conversion circuit, a power supply apparatus and an electronic device are proposed herein, which can provide a variety of different power outputs with rich functions; and the device with leakage protection can be used normally with good user experiences.

According to an embodiment in a first aspect of the present disclosure, a multi-channel alternating current conversion circuit is provided, including: an AC input terminal configured to input an AC voltage; an AC-AC conversion unit including a thyristor voltage reduction circuit, a no-load freewheeling voltage stabilizing circuit and a first AC output terminal, the AC input terminal being connected to an input terminal of the thyristor voltage reduction circuit and an input terminal of the no-load freewheeling voltage stabilizing circuit, respectively; an output terminal of the thyristor voltage reduction circuit and an output terminal of the no-load freewheeling voltage stabilizing circuit being connected to an output terminal of the first AC output terminal, respectively; and the no-load freewheeling voltage stabilizing circuit being configured to keep a voltage of the first AC output terminal stable through resistor-capacitor voltage reduction and voltage division under no-load conditions; an AC-AC voltage reduction unit, the AC input terminal being connected to an input terminal of the AC-AC voltage reduction unit, and the AC-AC voltage reduction unit being configured to reduce the input AC voltage to obtain reduced AC voltage and output the reduced AC voltage; and an AC-DC voltage reduction unit, the AC input terminal being connected to an input terminal of the AC-DC voltage reduction unit, and the AC-DC voltage reduction unit being configured to convert the AC voltage from the input terminal into a DC voltage and output the DC voltage.

According to some embodiments of the present disclosure, the AC-AC conversion unit further includes a constant temperature control circuit connected to a control terminal of the thyristor voltage reduction circuit for reducing output power of a thyristor when a temperature of the thyristor voltage reduction circuit rises to keep the temperature constant.

According to some embodiments of the present disclosure, the constant temperature control circuit includes a positive temperature coefficient (PTC) resistor connected in series to the control terminal of the thyristor voltage reduction circuit.

According to some embodiments of the present disclosure, the first AC output terminal includes a first neutral terminal, a second neutral terminal, a first live wire terminal and a second live wire terminal, the output terminal of the thyristor voltage reduction circuit is connected to the first live wire terminal, a neutral terminal of the AC input terminal is connected to the first neutral terminal, a live wire output terminal of the no-load freewheeling voltage stabilizing circuit is connected to the second live wire terminal, and a neutral output terminal of the no-load freewheeling voltage stabilizing circuit is connected to the second neutral wire terminal.

According to some embodiments of the present disclosure, the AC-AC voltage reduction unit includes a first AC-DC voltage reduction circuit, a current and voltage detection circuit, a constant-current stabilized-voltage control unit, a DC-AC inverter circuit and a second AC output terminal, the AC input terminal is connected to an input terminal of the first AC-DC voltage reduction circuit, an output terminal of the first AC-DC voltage reduction circuit is connected to an input terminal of the DC-AC inverter circuit through the current and voltage detection circuit, an output terminal of the DC-AC inverter circuit is connected to the second AC output terminal, the current and voltage detection circuit is connected to the constant-current stabilized-voltage control unit for feeding back sampled current and voltage, and an output terminal of the constant-current stabilized-voltage control unit is connected to a control terminal of the DC-AC inverter circuit for controlling an output of the DC-AC inverter circuit based on the sampled current and voltage.

According to some embodiments of the present disclosure, the AC-DC voltage reduction unit includes a second AC-DC voltage reduction circuit, a DC-DC voltage reduction circuit, a first DC output terminal and a second DC output terminal, the AC input terminal is connected to an input terminal of the second AC-DC voltage reduction circuit, an output terminal of the second AC-DC voltage reduction circuit is connected to an input terminal of the DC-DC voltage reduction circuit and the second DC output terminal, respectively, and an output terminal of the DC-DC voltage reduction circuit is connected to the first DC output terminal.

According to an embodiment in a second aspect of the present disclosure, a power supply apparatus is provided, including the multi-channel alternating current conversion circuit in the first aspect of the present disclosure.

According to an embodiment in a third aspect of the present disclosure, an electronic device is provided, including the power supply apparatus in the second aspect of the present disclosure.

According to an embodiment of the present disclosure, the multi-channel alternating current conversion circuit, the power supply apparatus and the electronic device have at least the following beneficial effects.

In the present disclosure, two AC outputs are provided through the AC-AC conversion unit and the AC-AC voltage reduction unit, and one DC output is provided through the AC-DC voltage reduction unit. This configuration offers multiple power outputs, rich functionality, and meets the power requirements of various electronic devices. In addition, the no-load freewheeling voltage stabilizing circuit in parallel with the thyristor voltage reduction circuit is disposed in the AC-AC conversion unit. Due to the intervention of the no-load freewheeling voltage stabilizing circuit, the thyristor in the thyristor voltage reduction circuit remains the voltage of the first AC output terminal a continuous and stable voltage waveform through resistor-capacitor voltage reduction and voltage division of the no-load freewheeling voltage stabilizing circuit under no-load conditions. The stable voltage waveform can smoothly pass through the leakage protection without triggering the leakage protection function. Therefore, the device with leakage protection can be used normally with good user experiences.

Additional aspects and advantages of the present disclosure will be set forth in part in the description below, and in part will be obvious from the description, or may be learned by practice of the present disclosure.

BRIEF DESCRIPTION OF DRAWINGS

The present disclosure will be further described below in conjunction with the accompanying drawings and embodiments, where.

DETAILED DESCRIPTION

Figure 1:
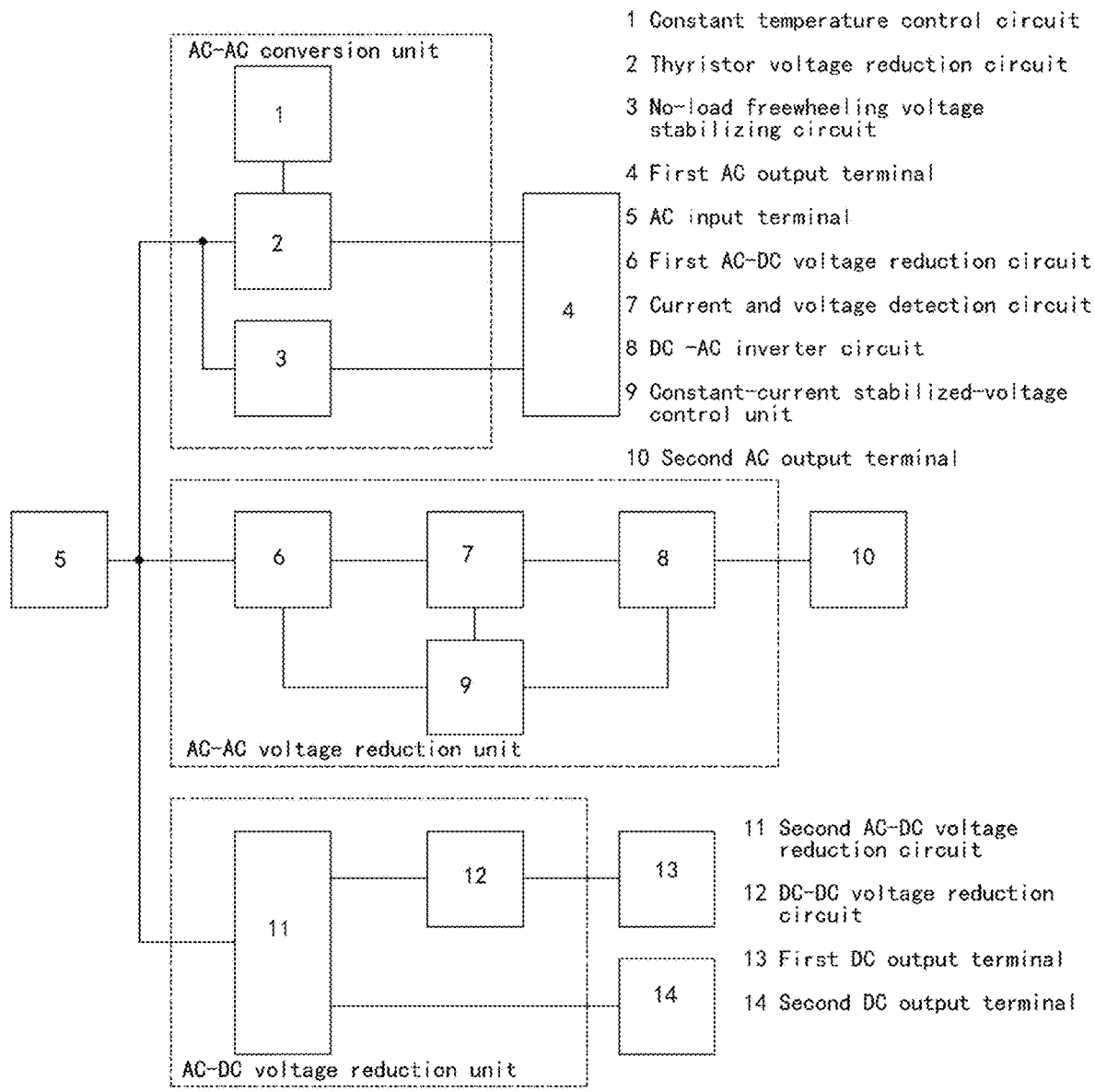
FIG. 1 is a functional block diagram of a multi-channel alternating current conversion circuit in an embodiment of the present disclosure.

The embodiments of the present disclosure are described in detail below. Examples of embodiments are shown in the accompanying drawings, in which the same or similar reference numerals throughout represent the same or similar elements or elements with the same or similar functions. Embodiments described below with reference to the accompanying drawings are exemplary and are only used to explain the present disclosure and cannot be understood as limitations of the present disclosure.

In the description of the present disclosure, it should be understood that the orientation descriptions involved, such as the orientation or positional relationship indicated by terms "up" and "down", etc. are based on the orientation or positional relationship shown in the accompanying drawings. They are only for the convenience of describing the present disclosure and simplifying the description, and are not intended to indicate or imply that the device or element referred to must have a specific orientation, be constructed and operated in a specific orientation, and therefore cannot be construed as a limitation of the present disclosure.

In the description of the present disclosure, the term "a plurality of" refers to two or more. If there is a description of first and second, it is only for the purpose of distinguishing technical features, and cannot be understood as indicating or implying the relative importance or implicitly indicating the number of indicated technical features or implicitly indicating the precedence relationship of indicated technical features.

In the description of the present disclosure, unless otherwise explicitly limited, words such as setting, installation, and connection should be understood in a broad sense. Those having ordinary skills in the art may reasonably determine the specific meaning of the words above in the present disclosure in combination with the specific content of the technical solution.

The present disclosure is to intended to solve problems of the AC conversion circuit with single function and poor user experiences. Firstly, some background of the present disclosure will be introduced below. With the development of industry and technology, various electronic products and home appliances and other electronic devices emerge continuously. However, the various electronic products and home appliances require different operating voltages and types. Therefore, alternating current conversion circuits have been developed to process alternating current (AC) and generate alternating current or direct current (DC) with different voltage levels to meet the requirements of different electronic devices. The disadvantages of current alternating current conversion circuit are as follows: 1) the current alternating current conversion circuit can only provide a single AC or DC output with single function; and 2) some AC conversion circuits apply thyristor voltage reduction circuits to achieve AC output. However, a device with leakage protection cannot be used in thyristor circuits, resulting in poor user experiences.

Regarding the problem that a device with leakage protection cannot be used in the thyristor circuit, this is because the circuit in the leakage protection plug contains certain capacitive components. The capacitive components may cause the thyristor circuit to malfunction under no-load conditions, leading to issues such as uncontrolled thyristor operation, abnormal voltage surges, and irregular output waveforms. Because the thyristor circuit cannot operate normally under no-load conditions, when the thyristor's on-state in the positive and negative half cycles (such as the conduction time and angle) is not fully symmetrical or consistent, the energy in the positive and negative half cycles cannot be completely offset. After the device with leakage protection is connected, the leakage protection device in the leakage protector detects and amplifies the remaining energy of the positive and negative half cycles, and the remaining energy is detected through the internal circuit. If the remaining energy is too large, the leakage protection device interprets this as a leakage condition and triggers protection, preventing the device from functioning.

In order to solve the above problems, a multi-channel alternating current conversion circuit, a power supply apparatus, and an electronic device are proposed herein. The multi-channel alternating current conversion circuit of the present disclosure is first introduced below. Referring to FIG. 1, the multi-channel alternating current conversion circuit includes: an AC input terminal, an AC-AC conversion unit, an AC-AC voltage reduction unit and AC-DC voltage reduction unit. The AC input terminal is configured to input AC voltage, such as 220V mains electricity.

In this embodiment, the AC-AC conversion unit includes a thyristor voltage reduction circuit, a no-load freewheeling voltage stabilizing circuit and a first AC output terminal. The AC input terminal is connected to an input terminal of the thyristor voltage reduction circuit and an input terminal of the no-load freewheeling voltage stabilizing circuit, respectively. An output terminal of the thyristor voltage reduction circuit and an output terminal of the no-load freewheeling voltage stabilizing circuit are connected to an output terminal of the first AC output terminal, respectively. The no-load freewheeling voltage stabilizing circuit is configured to keep a voltage of the first AC output terminal stable through resistor-capacitor voltage reduction and voltage division under no-load conditions. The AC input terminal is connected to an input terminal of the AC-AC voltage reduction unit. The AC-AC voltage reduction unit is configured to reduce the AC voltage and output the reduced AC voltage. The AC input terminal is connected to an input terminal of the AC-DC voltage reduction unit. The AC-DC voltage reduction unit is configured to convert the input AC voltage into DC voltage and outputs it.

In an embodiment of the present disclosure, two AC outputs are provided through the AC-AC conversion unit and the AC-AC voltage reduction unit, and one DC output is provided through the AC-DC voltage reduction unit. This configuration offers multiple power outputs, rich functionality, and meets the power requirements of various electronic devices. In addition, the no-load freewheeling voltage stabilizing circuit in parallel with the thyristor voltage reduction circuit is disposed in the AC-AC conversion unit. Due to the intervention of the no-load freewheeling voltage stabilizing circuit, the thyristor in the thyristor voltage reduction circuit remains the voltage of the first AC output terminal a continuous and stable voltage waveform through resistor-capacitor voltage reduction and voltage division of the no-load freewheeling voltage stabilizing circuit under no-load conditions. The stable voltage waveform can smoothly pass through the leakage protection without triggering the leakage protection function. Therefore, the device with leakage protection can be used normally with good user experiences.

Figure 2:
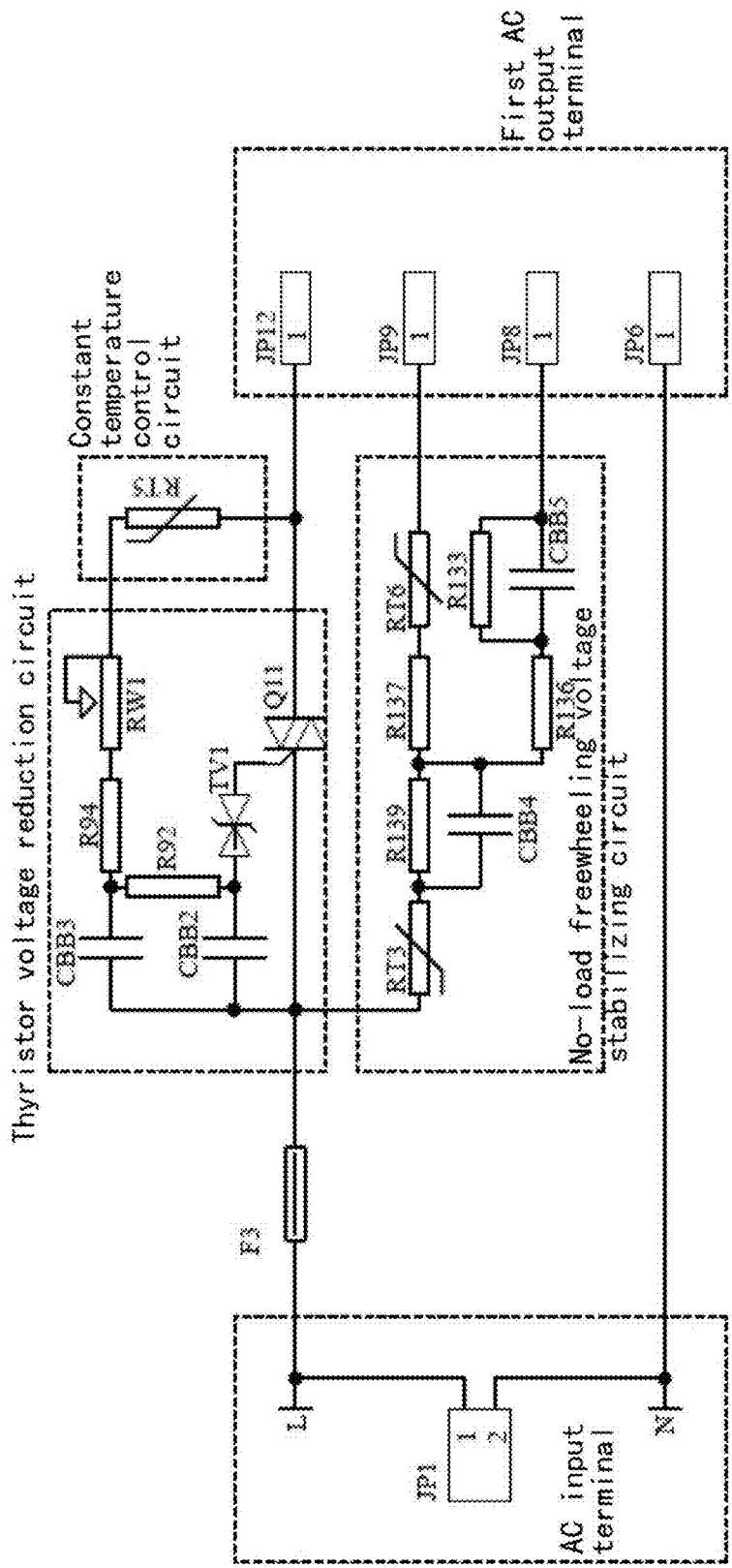
FIG. 2 is a schematic circuit diagram of an AC-AC conversion unit in an embodiment of the present disclosure.

Referring to FIG. 2, the thyristor voltage reduction circuit in an embodiment of the present disclosure includes a thyristor Q11, a capacitor CBB2, a capacitor CBB3, a resistor R92, a resistor R94, an adjustable resistor RW1 and a bidirectional trigger diode TV1. JP1 is an interface of the AC input terminal. A live wire terminal L of the interface JP1 is connected to an input terminal of the thyristor Q11 through the fuse F3. An output terminal of the thyristor Q11 is connected to a live wire terminal of the first AC output terminal. A neutral terminal N of the interface JP1 is connected to a neutral terminal of the first AC output terminal. A gate of the thyristor Q11 is connected to one end of the bidirectional trigger diode TV1. The other end of the bidirectional trigger diode TV1 is connected to the other end of the capacitor CBB2 and one end of the resistor R92. The input terminal of the thyristor Q11 is connected to one end of the capacitor CBB2 and one end of the capacitor CBB3. The other end of the resistor R92 is connected to the other end of the capacitor CBB3. The other end of the capacitor CBB3 is connected to the output terminal of the thyristor Q11 through the resistor R94 and the adjustable resistor RW1 connected in series.

The no-load freewheeling voltage stabilizing circuit includes a resistor RT3, a resistor R139, a resistor R137, a resistor RT6, a resistor R136, a resistor R133, a capacitor CBB4 and a capacitor CBB5. The resistor RT3 and the resistor RT6 are PTC (Positive Temperature Coefficient) resistors. The input terminal of the thyristor Q11 is connected to the live wire terminal of the first AC output terminal through the resistor RT3, the resistor R139, the resistor R137 and the resistor RT6 connected in series. The common terminal of the resistor RT3 and the resistor R139 is connected to one end of the capacitor CBB4. The other end of the capacitor CBB4 is connected to the neutral terminal of the first AC output terminal through the resistors R136 and R133 connected in series at the other end thereof. The other end of the capacitor CBB4 is further connected to the common terminal of the resistor R139 and the resistor R137. The capacitor CBB5 is connected in parallel with the resistor R133.

The operating principles of the thyristor voltage reduction circuit and the no-load freewheeling voltage stabilizing circuit in an embodiment of the present disclosure are as follows.

The objective of the no-load freewheeling voltage stabilizing circuit in the present disclosure is to ensure that the thyristor voltage reduction circuit remains a continuous and stable voltage at the output terminal under no-load conditions. The thyristor voltage reduction circuit, by controlling the conduction time of the thyristor, implements delayed start-up (in the form of chopping) of the input AC voltage for each half cycle to ultimately complete the control of the output load power.

Figure 3:
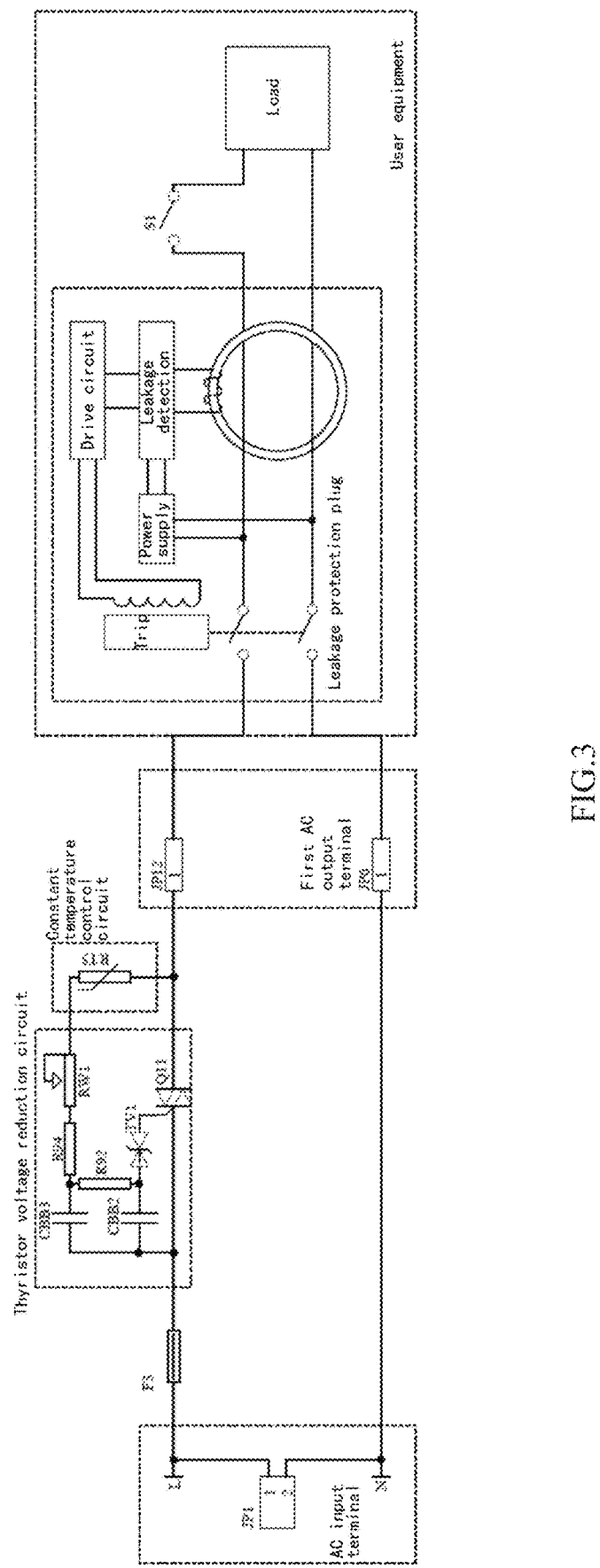
FIG. 3 is a schematic circuit diagram of a connection between a thyristor voltage reduction circuit and a device with leakage protection in the related art.

Referring to FIG. 3, there is no no-load freewheeling voltage stabilizing circuit and only a thyristor voltage reduction circuit is provided, the user equipment with a leakage protection plug is connected to the first AC output terminal. When the switch Si is closed, at the user equipment end, only the leakage protection plug is connected to the thyristor voltage reduction circuit. However, the load in the leakage protection plug is very small and the current consumption is also very small. According to the characteristics of the thyristor, the thyristor Q11 requires a certain operating current to continue to be conducted after normal conduction. Since the operating current of the leakage protection plug is too small to maintain the normal conduction of the thyristor Q11, the thyristor Q11 will prematurely cut off. This causes inconsistent conduction times of the thyristor Q11 during the positive and negative half cycles of the AC, leading to leftover energy due to that the energy of the positive and negative half cycles cannot be offset. When passing through the leakage protection plug, this remaining energy will be amplified by the leakage detection circuit and activates the leakage protection by controlling the output of the trip switch through a drive circuit, causing the device to be unable to function.

Figure 4:
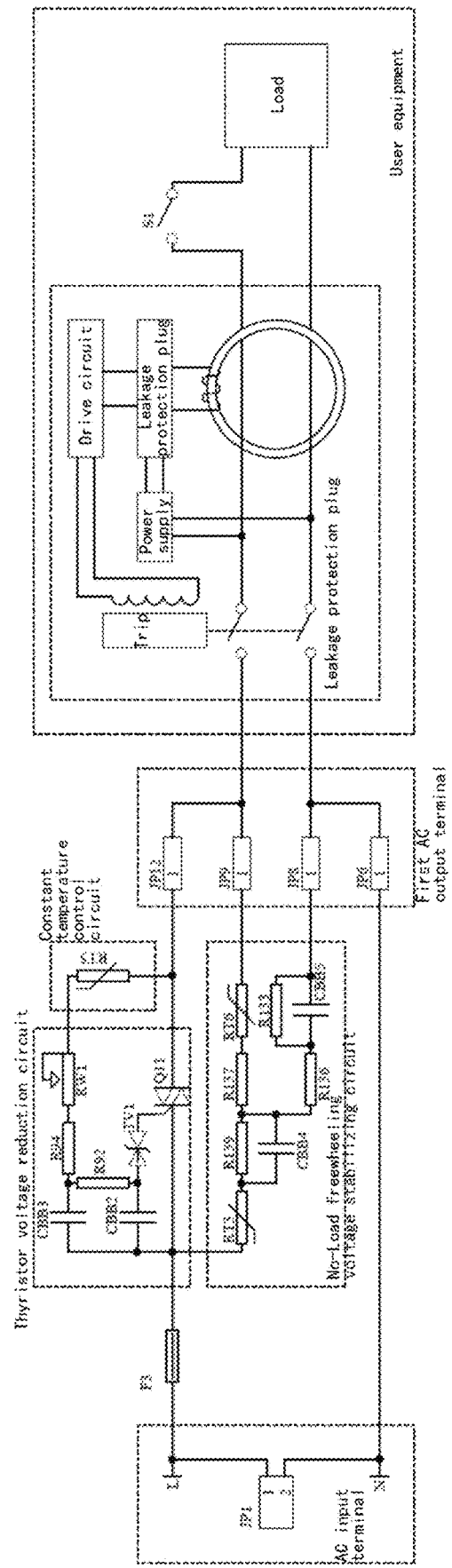
FIG. 4 is a schematic circuit diagram of a connection between the AC-AC conversion unit and the device with leakage protection in an embodiment of the present disclosure.

Referring to FIG. 4, since the operating current of the leakage protection plug is too small to maintain the normal conduction of the thyristor, the thyristor will prematurely cut off. However, when the no-load freewheeling voltage stabilizing circuit is connected, the operating current of the leakage protection plug is provided by the circuit consisting of the resistors RT3, R139, R137 and RT6 connected in series, and the current is continuous in the positive and negative half cycles, avoiding issues with inconsistent current between positive and negative half cycles, and thus preventing the leakage protection from activating and rendering the device unusable. By using the resistor R136/capacitor CBB5 in series with the resistor RT3/resistor R139 for voltage division, the stability of the output voltage of the first AC output terminal can be ensured by selecting appropriate component parameters.

According to some embodiments of the present disclosure, with reference to FIG. 1, the AC-AC conversion unit in an embodiment of the present disclosure further includes a constant temperature control circuit. The constant temperature control circuit is connected to a control terminal of the thyristor voltage reduction circuit for reducing output power of the thyristor when the temperature of the thyristor voltage reduction circuit rises to keep the temperature constant.

In this embodiment, the constant temperature control circuit is used to a constant temperature for the thyristor voltage reduction circuit, which can reduce the risk of over-temperature damage to the thyristor.

It should be noted that the constant temperature control circuit may detect the temperature of the thyristor voltage reduction circuit through a temperature sensor, which is connected with a control terminal of the thyristor Q11 through an MCU or other control modules. When detecting that the temperature is too high, the MCU may control the thyristor Q11 to reduce the conduction time, thereby achieving constant temperature control.

According to some embodiments of the present disclosure, the constant temperature control circuit includes a PTC resistor RT5 connected in series to the control terminal of the thyristor voltage reduction circuit.

In this embodiment, constant temperature control of the thyristor voltage reduction circuit can be achieved only by connecting a PTC resistor in series to the control terminal of the thyristor voltage reduction circuit, thereby saving costs.

Referring to FIG. 2, in an embodiment of the present disclosure, the PTC resistor RT5 is connected in series between the adjustable resistor RW1 and the output terminal of the thyristor Q11, and the PTC resistor RT5 is placed close to the thyristor Q11. The operating principle of the constant temperature control circuit is as follows.

The adjustable resistor RW1 and the resistor R94 are both current-limiting resistors. The adjustable resistor RW1 is used to adjust the series current to ensure consistent output voltage of the product. The capacitor CBB3 is an energy storage capacitor. The resistor R92 and the capacitor CBB2 form an RC filter circuit. In the present disclosure, the input high AC voltage (such as AC 220V) is stepped down to an output low AC voltage (such as AC 110V) by controlling the conduction time of thyristor Q11. In the AC circuit, the thyristor Q11 is conducted once every half cycle. The normal conduction time of the thyristor Q11 per half cycle depends on the series current limit of the adjustable resistor RW1 and the resistor R94 and the charging time and voltage of the capacitor CBB3. When the voltage across the capacitor CBB3 reaches the triggering threshold of the bidirectional trigger diode TV1, filtering by the resistor R92 and the capacitor CBB2, the thyristor Q11 is turned on through the bidirectional trigger diode TV1. Since the adjustable resistor RW1, resistor R94, capacitor CBB3, resistor R92, capacitor CBB2 and bidirectional trigger diode TV1 are fixed parameter devices, the conduction time of the thyristor is mainly limited by the series resistance or current of the RT5 device. Since the PTC resistor RT5 is in close contact with the thyristor Q1l, when the temperature of the thyristor Q11 continues to rise under long-term or high-load operating conditions, the temperature rise is transferred to the PTC resistor RT5. Since the PTC resistor RT5 is a PTC positive temperature device, as the temperature of the PTC resistor RT5 rises and the internal resistance increases, the series resistance value in the conduction circuit of the thyristor Q11 may also increase to cause the series current to decrease, thereby prolonging the charging time of the capacitor CBB3, resulting in a shorter conduction time of the thyristor Q11, and shortening the operating time per unit of the load connected to the output terminal of the thyristor Q11, thus achieving the objective of reducing power.

According to some embodiments of the present disclosure, the first AC output terminal includes a first neutral terminal JP6, a second neutral terminal JP8, a first live wire terminal JP12 and a second live wire terminal JP9. The output terminal of the thyristor Q11 is connected to the first live wire terminal JP12. The neutral terminal N of the AC input terminal is connected to the first neutral terminal JP6. A live wire output terminal of the no-load freewheeling voltage stabilizing circuit, that is, the resistor RT6, is connected to the second live wire terminal JP9. A neutral output terminal of the no-load freewheeling voltage stabilizing circuit, that is, the resistor R133, is connected to the second neutral terminal JP8.

The no-load freewheeling voltage stabilizing circuit consumes power during operation. Therefore, in this embodiment of the present disclosure, the neutral line is divided into two contact terminals so that when a load is connected to the neutral line, it simultaneously connects and conducts with both the first neutral terminal JP6 and the second neutral terminal JP8, allowing the no-load freewheeling voltage stabilizing circuit to operate normally. When the load is disconnected, the first neutral terminal JP6 and the second neutral terminal JP8 are disconnected, and the no-load freewheeling voltage stabilizing circuit stops operating, thereby reducing circuit losses. Similarly, the first and second live terminals JP12 and JP9 function in the same way. Therefore, the neutral terminal and the live wire terminal of the first AC output terminal are respectively divided into two terminals in the present disclosure, forming a low-power-consumption device without insertion. When no device is connected, the no-load freewheeling voltage stabilizing circuit is not connected to the circuit. At this time, there is no loss, which can effectively reduce no-load power consumption.

According to some embodiments of the present disclosure, the AC-AC voltage reduction unit includes a first AC-DC voltage reduction circuit, a current and voltage detection circuit, a constant-current stabilized-voltage control unit, a DC-AC inverter circuit and a second AC output terminal. The AC input terminal is connected to an input terminal of the first AC-DC voltage reduction circuit. An output terminal of the first AC-DC voltage reduction circuit is connected to an input terminal of the DC-AC inverter circuit through the current and voltage detection circuit. An output terminal of the DC-AC inverter circuit is connected to the second AC output terminal. The current and voltage detection circuit is connected to the constant-current stabilized-voltage control unit for feeding back sampled current and voltage. The output terminal of the constant-current stabilized-voltage control unit is connected to a control terminal of the DC-AC inverter circuit for controlling the output of the DC-AC inverter circuit based on the sampled current and voltage.

Figure 5:
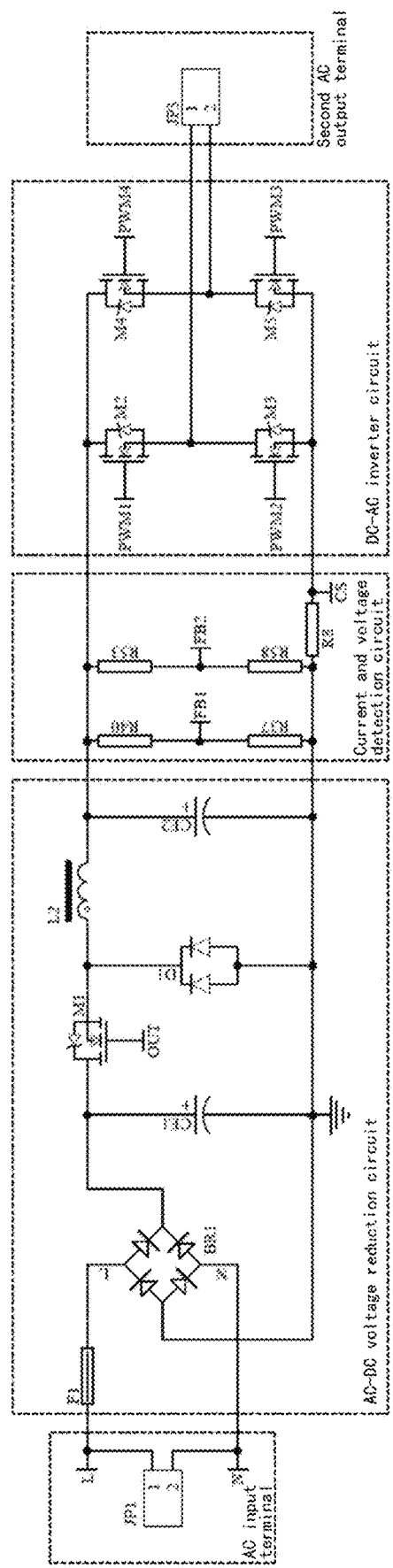
FIG. 5 is a schematic circuit diagram of an AC-AC voltage reduction unit in an embodiment of the present disclosure.
Figure 6:
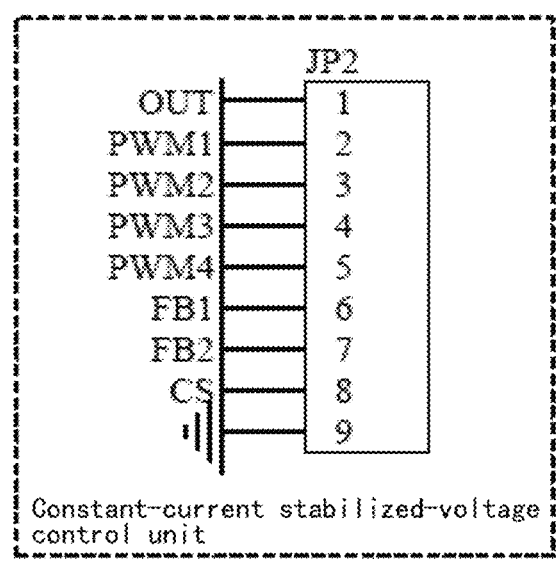
FIG. 6 is an interface diagram of a constant-current stabilized-voltage control unit in the AC-AC voltage reduction unit.

Referring to FIGS. 5 and 6, the current and voltage detection circuit in an embodiment of the present disclosure includes a first voltage sampling circuit formed by a resistor R53 and a resistor R58 connected in series, a second voltage sampling circuit formed by a resistor R37 and a resistor R40 connected in series, and a current sampling circuit formed by a resistor R8. The DC-AC inverter circuit is formed by four switching transistors M2-M5. A switching transistor M1 is disposed in the first AC-DC voltage reduction circuit. The constant-current stabilized-voltage control unit uses an MCU. JP2 is the interface of the MCU. The common terminal of the resistor R53 and the resistor R58 is connected to the pin FB2 of the MCU. The common terminal of the resistor R37 and the resistor R40 is connected to the pin FB1 of the MCU. The output terminal of the resistor R8 is connected to the pin CS of the MCU, and the pin OUT of the MCU is connected to the control terminal of the switching transistor M1. The pins PWM1-PWM4 of the MCU are connected to the control terminals of the switching transistors M2-M5, respectively. The MCU performs calculation based on the voltage from the first voltage sampling circuit to obtain a control signal that can stabilize the on-off switching of the switching transistor M1 in the first AC-DC voltage reduction circuit, ensuring a stable voltage output in combination with the freewheeling diode D1, and the filtering of the inductor L2 and the capacitor CE2. Additionally, the MCU performs calculation to obtain a control signal for complementary switching of transistors M2/M5 and M3/M4 in the DC-AC inverter circuit, ensuring stable current and voltage at the AC output terminal.

In this embodiment, the constant-current stabilized-voltage control unit obtains the voltage and current through the current and voltage detection circuit and controls the switching transistors M1-M5, thereby stabilizing the current and voltage of the AC output terminal.

It should be noted that, in addition to the above methods, the AC voltage reduction output of the AC-AC voltage reduction unit may also be realized using only the first AC-DC voltage reduction circuit, the DC-AC inverter circuit and the second AC output terminal.

Figure 7:
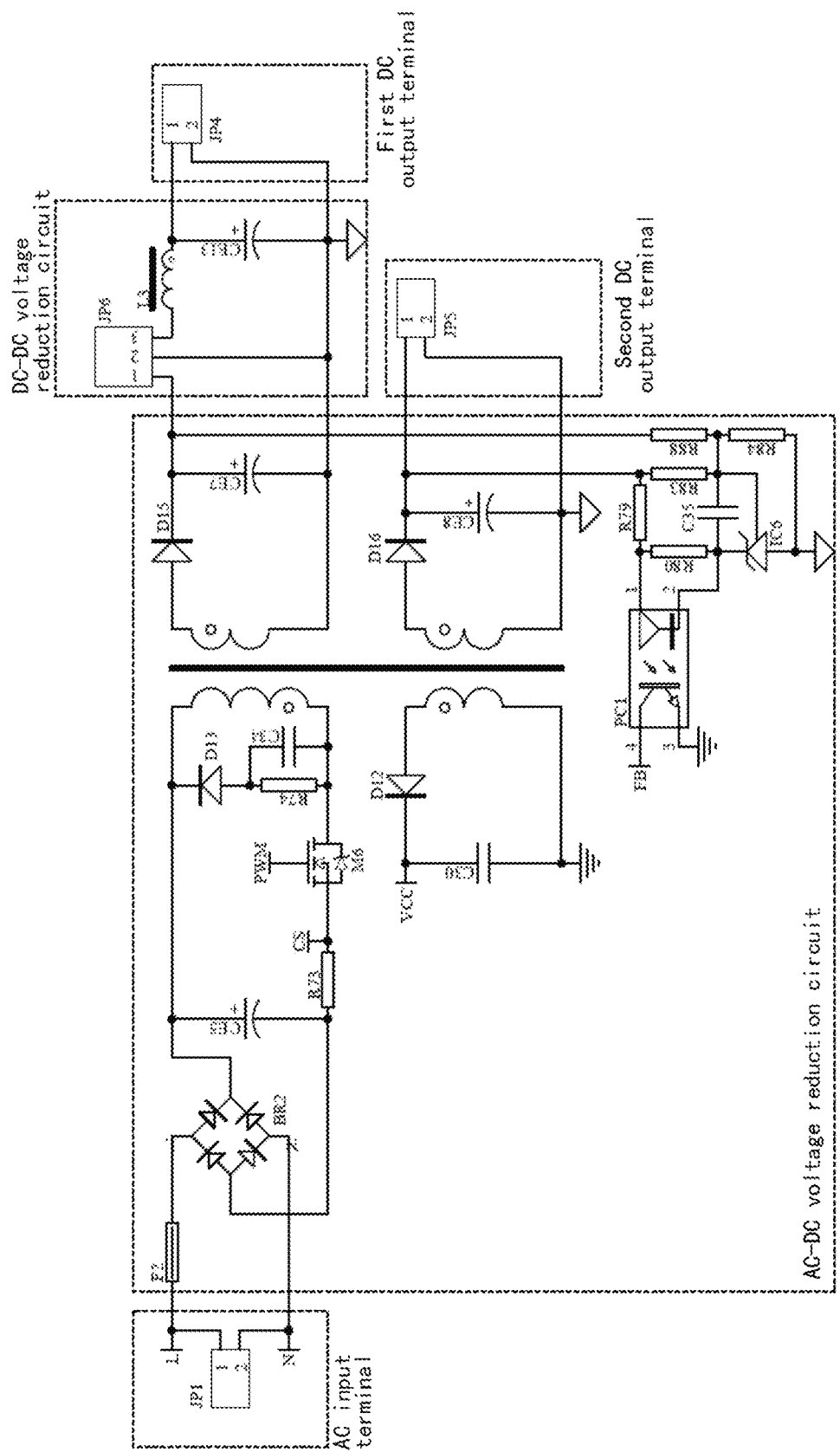
FIG. 7 is a schematic circuit diagram of the AC-DC voltage reduction unit in an embodiment of the present disclosure.

According to some embodiments of the present disclosure, with reference to FIG. 7, the AC-DC voltage reduction unit includes a second AC-DC voltage reduction circuit, a DC-DC voltage reduction circuit, a first DC output terminal and a second DC output terminal. The AC input terminal is connected to the input terminal of the second AC-DC voltage reduction circuit. The output terminal of the second AC-DC voltage reduction circuit is connected to the input terminal of the DC-DC voltage reduction circuit and the second DC output terminal, respectively. The output terminal of the DC-DC voltage reduction circuit is connected to the first DC output terminal.

In this embodiment, two channels of DC output are realized through the second AC-DC voltage reduction circuit and the DC-DC voltage reduction circuit respectively, enhancing the functionality of the power output.

It should be noted that, in addition to the above methods, it is also possible to use only one DC output or a plurality of DC-DC modules to achieve more channels of DC output.

The present disclosure further relates to a power supply apparatus, including the multi-channel alternating current conversion circuit according to the embodiments above.

The present disclosure further relates to an electronic device, including the power supply apparatus according to the embodiments above.

The embodiments of the present disclosure have been described in detail above with reference to the accompanying drawings. However, the present disclosure is not limited to embodiments above. Within the scope of knowledge possessed by those of ordinary skill in the art, various modifications can be made without departing from the gist of the present disclosure.

What is claimed is:

1. A multi-channel alternating current (AC) conversion circuit, comprising:
an AC input terminal configured to input an AC voltage;
an AC-AC conversion unit comprising a thyristor voltage reduction circuit, a no-load freewheeling voltage stabilizing circuit and a first AC output terminal, the AC input terminal being connected to an input terminal of the thyristor voltage reduction circuit and an input terminal of the no-load freewheeling voltage stabilizing circuit, respectively; an output terminal of the thyristor voltage reduction circuit and an output terminal of the no-load freewheeling voltage stabilizing circuit being connected to an output terminal of the first AC output terminal, respectively; and the no-load freewheeling voltage stabilizing circuit being configured to keep a voltage of the first AC output terminal stable through resistor-capacitor voltage reduction and voltage division under no-load conditions;
an AC-AC voltage reduction unit, the AC input terminal being connected to an input terminal of the AC-AC voltage reduction unit, and the AC-AC voltage reduction unit being configured to reduce the input AC voltage to obtain reduced AC voltage and output the reduced AC voltage; and
an AC-DC voltage reduction unit, the AC input terminal being connected to an input terminal of the AC-DC voltage reduction unit, and the AC-DC voltage reduction unit being configured to convert the AC voltage from the input terminal into a DC voltage and output the DC voltage.

2. The multi-channel alternating current conversion circuit according to claim 1, wherein the AC-AC conversion unit further comprises a constant temperature control circuit connected to a control terminal of the thyristor voltage reduction circuit for reducing output power of a thyristor when a temperature of the thyristor voltage reduction circuit rises to keep the temperature constant.

3. The multi-channel alternating current conversion circuit according to claim 2, wherein the constant temperature control circuit comprises a positive temperature coefficient (PTC) resistor connected in series to the control terminal of the thyristor voltage reduction circuit.

4. The multi-channel alternating current conversion circuit according to claim 1, wherein the first AC output terminal comprises a first neutral terminal, a second neutral terminal, a first live wire terminal and a second live wire terminal, the output terminal of the thyristor voltage reduction circuit is connected to the first live wire terminal, a neutral terminal of the AC input terminal is connected to the first neutral terminal, a live wire output terminal of the no-load freewheeling voltage stabilizing circuit is connected to the second live wire terminal, and a neutral output terminal of the no-load freewheeling voltage stabilizing circuit is connected to the second neutral wire terminal.

5. The multi-channel alternating current conversion circuit according to claim 1, wherein the AC-AC voltage reduction unit comprises a first AC-DC voltage reduction circuit, a current and voltage detection circuit, a constant-current stabilized-voltage control unit, a DC-AC inverter circuit and a second AC output terminal, the AC input terminal is connected to an input terminal of the first AC-DC voltage reduction circuit, an output terminal of the first AC-DC voltage reduction circuit is connected to an input terminal of the DC-AC inverter circuit through the current and voltage detection circuit, an output terminal of the DC-AC inverter circuit is connected to the second AC output terminal, the current and voltage detection circuit is connected to the constant-current stabilized-voltage control unit for feeding back sampled current and voltage, and an output terminal of the constant-current stabilized-voltage control unit is connected to a control terminal of the DC-AC inverter circuit for controlling an output of the DC-AC inverter circuit based on the sampled current and voltage.

6. The multi-channel alternating current conversion circuit according to claim 1, wherein the AC-DC voltage reduction unit comprises a second AC-DC voltage reduction circuit, a DC-DC voltage reduction circuit, a first DC output terminal and a second DC output terminal, the AC input terminal is connected to an input terminal of the second AC-DC voltage reduction circuit, an output terminal of the second AC-DC voltage reduction circuit is connected to an input terminal of the DC-DC voltage reduction circuit and the second DC output terminal, respectively, and an output terminal of the DC-DC voltage reduction circuit is connected to the first DC output terminal.

7. A power supply apparatus, comprising the multi-channel alternating current conversion circuit according to claim 1.

8. An electronic device, comprising the power supply apparatus according to claim 7.

* * * * *